(12) United States Patent
Bosscher et al.

(10) Patent No.: US 8,943,902 B2
(45) Date of Patent: Feb. 3, 2015

(54) FORCE AND TORQUE SENSORS

(71) Applicant: Harris Corporation, Melbourne, FL (US)

(72) Inventors: Paul M. Bosscher, West Melbourne, FL (US); Matthew D. Summer, Melbourne, FL (US); John B. Rust, Indialantic, FL (US); Nicholas Murphy-DuBay, Palm Bay, FL (US); William S. Bowman, Melbourne, FL (US); Loran J. Wilkinson, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 253 days.

(21) Appl. No.: 13/645,568

(22) Filed: Oct. 5, 2012

(65) Prior Publication Data

US 2014/0096621 A1    Apr. 10, 2014

(51) Int. Cl.
*G01D 7/00*  (2006.01)
*G01L 1/22*  (2006.01)

(52) U.S. Cl.
USPC ............ 73/862.044; 73/862.041; 73/862.043; 73/862.042; 73/862.045

(58) Field of Classification Search
CPC ....... G01L 5/161; G01L 5/226; G01L 3/1457; G01L 1/2206; G01L 1/2218; G01L 1/2243
USPC ...................... 73/862.041–862.045, 862.632, 73/862.621–862.628, 862.08, 862.191, 73/862.21, 862.23, 862.321, 862.325, 73/862.338

See application file for complete search history.

(56) References Cited

U.S. PATENT DOCUMENTS

| | | | | |
|---|---|---|---|---|
| 3,618,376 | A | * 11/1971 | Shull et al. | 73/862.045 |
| 4,094,192 | A | * 6/1978 | Watson et al. | 73/862.044 |
| 4,453,422 | A | 6/1984 | Yorgiadis | |
| 4,573,362 | A | * 3/1986 | Amlani | 73/862.045 |
| 4,620,436 | A | * 11/1986 | Hirabayashi et al. | 73/1.15 |
| 4,637,263 | A | 1/1987 | Fritz et al. | |
| 4,869,113 | A | 9/1989 | Sarrazin | |
| 4,911,024 | A | * 3/1990 | McMaster | 73/862.045 |
| 5,063,788 | A | * 11/1991 | Ch'Hayder et al. | 73/862.043 |
| 5,490,427 | A | * 2/1996 | Yee et al. | 73/767 |
| 5,969,268 | A | * 10/1999 | Sommerfeld et al. | 73/862.041 |
| 6,253,626 | B1 | 7/2001 | Shoberg et al. | |
| 6,295,878 | B1 | * 10/2001 | Berme | 73/862.044 |
| 6,769,312 | B2 | * 8/2004 | Meyer et al. | 73/862.042 |

(Continued)

FOREIGN PATENT DOCUMENTS

JP          2005 265814 A       9/2005

OTHER PUBLICATIONS

International Search Report mailed Jun. 3, 2014, Application Serial No. PCT/US2013/063339, in he name of Harris Corporation.

*Primary Examiner* — Lisa Caputo
*Assistant Examiner* — Jonathan Dunlap
(74) *Attorney, Agent, or Firm* — Fox Rothschild LLP; Robert J. Sacco, Esq.

(57) ABSTRACT

Force and torque sensors (10, 10*a*) include a load-bearing element (12), and strain gauges (20, 22, 23) mounted on the load-bearing element (12) so that the strain gauges (20, 22, 23) generate outputs responsive to external forces and moments applied to the load-bearing element (12). The strain gauges (20, 22, 23) are configured, and the responsive outputs of the strain gauges (20, 22, 23) are processed such that the force and moment measurements generated by the sensors (10, 10*a*) are substantially immune from drift due to thermally-induced strain in the load-bearing element (12).

27 Claims, 9 Drawing Sheets

(56) References Cited

U.S. PATENT DOCUMENTS

| | | |
|---|---|---|
| 6,792,815 B2 * | 9/2004 | McDearmon et al. ... 73/862.041 |
| 6,799,479 B1 * | 10/2004 | Talaski et al. ............ 73/862.043 |
| 6,915,709 B2 * | 7/2005 | Okada ...................... 73/862.041 |
| 7,188,535 B1 * | 3/2007 | Spletzer ................... 73/862.041 |
| 7,437,954 B2 * | 10/2008 | Sakano ................... 73/862.044 |
| 7,594,445 B2 | 9/2009 | Hirabayashi et al. |
| 8,161,828 B1 * | 4/2012 | Clegg et al. .............. 73/862.338 |
| 8,265,792 B2 * | 9/2012 | Wampler et al. ............... 700/254 |
| 2002/0059837 A1 * | 5/2002 | Meyer et al. ............. 73/862.042 |
| 2006/0213287 A1 * | 9/2006 | Sakano .................... 73/862.042 |
| 2012/0166105 A1 | 6/2012 | Biermann et al. |
| 2013/0061689 A1 * | 3/2013 | Mehlmauer et al. ...... 73/862.045 |
| 2013/0239701 A1 * | 9/2013 | Huang .................... 73/862.045 |

\* cited by examiner $$\begin{pmatrix} F_x \\ F_y \\ M_x \\ M_y \\ M_z \end{pmatrix} = [C1]_{5\times 6} \cdot \begin{pmatrix} v_1 \\ \vdots \\ v_6 \end{pmatrix} + b1_{5\times 1}$$

*FIG. 12*

$$\begin{pmatrix} F_x \\ F_y \\ M_x \\ M_y \\ M_z \end{pmatrix} = [C1]_{5\times 6} \cdot \begin{pmatrix} v_1 \\ \vdots \\ v_6 \end{pmatrix} + b1_{5\times 1} = [C1]_{5\times 6} \cdot \begin{pmatrix} v_1 + \Delta \\ \vdots \\ v_6 + \Delta \end{pmatrix} + b1_{5\times 1}$$

*FIG. 13*

$$F_z = [C2]_{1\times 6} \cdot \begin{pmatrix} F_x \\ F_y \\ M_x \\ M_y \\ M_z \\ v_z \end{pmatrix} + b2$$

*FIG. 14*

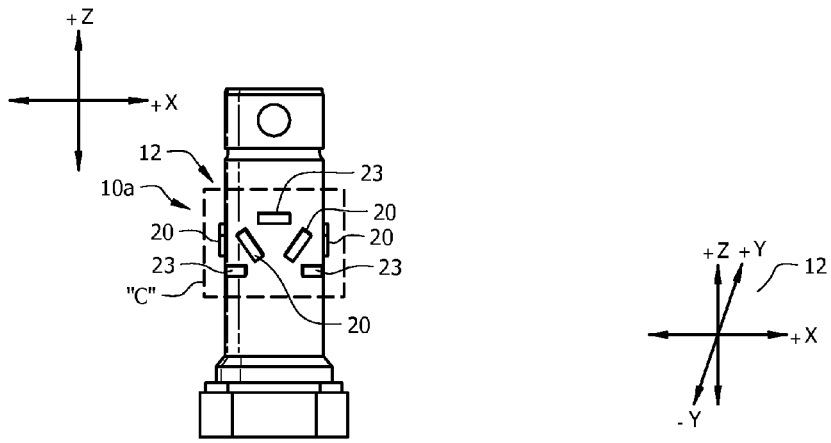
FIG. 18
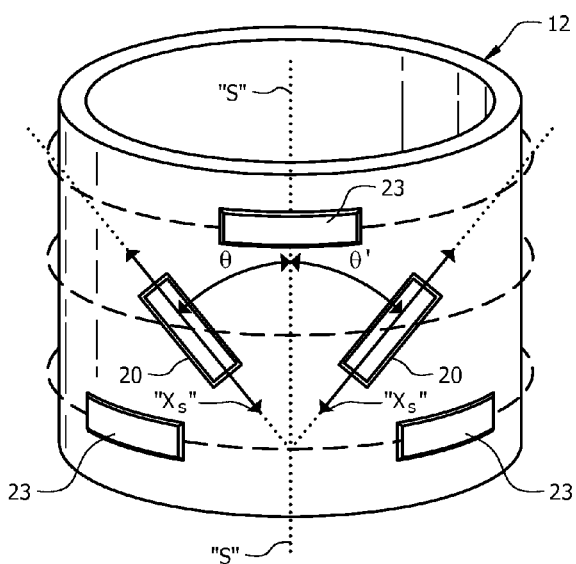
FIG. 19
$$\begin{pmatrix} F_x \\ F_y \\ F_z \\ M_x \\ M_y \\ M_z \end{pmatrix} = [C3]_{6 \times 12} \cdot \begin{pmatrix} v_1 \\ \vdots \\ v_{12} \end{pmatrix} + b_{12 \times 1}$$
FIG. 20

FORCE AND TORQUE SENSORS

BACKGROUND

1. Statement of the Technical Field

The inventive concepts relate to sensors for measuring physical forces and torques.

2. Description of Related Art

Force and torque sensors are commonly used to determine the physical forces and torques, i.e., moments, acting on a mechanical element or structure. Force and torque sensors typically include a load-bearing element, or flexure, and a plurality of strain gauges mounted on the flexure. The sensor is mounted so that the flexure is subjected to the forces and moments to be measured. The forces and moments, when applied to the flexure, induce deflection, or strain, in the flexure. Because the strain gauges are mounted on the flexure, the strain gauges themselves undergo strain in response to the strain experienced by the flexure, and the strain gauges generate outputs responsive to this strain. These outputs can be correlated to the magnitudes of the forces and moments acting on the flexure through predetermined data developed though a calibration process conducted on the sensor.

Force and torque sensors capable of measuring forces and torques acting in multiple directions typically include a relatively large number of active strain gauges, e.g., six axis force/torque sensors often include twenty or more. The use of a large number of strain gauges is typically necessary in order to allow the sensor to compensate for strain in the flexure induced by changes in the temperature of the flexure. However, the use of a large number of strain gages makes the sensors more complex, costly, and difficult to manufacture. Moreover, the flexures of such multi-axis sensors often have complex geometries in order to accommodate the strain gauges in specific orientations needed to measure multi-dimensional strain of the flexure. The complex flexure design can drive the overall size and weight of the flexure to undesirably high levels. Conversely, in applications where the flexure must be downsized in order to measure relatively small forces and torques, the complex geometry of the flexure may result in portions of the flexure being excessively thin or otherwise non-robust, which in turn can adversely affect the reliability and life of the flexure.

SUMMARY OF THE INVENTION

Sensors for measuring forces and torques include a load-bearing member having a longitudinal axis extending in a first direction, and a first and a second strain gauge mounted on a surface of the load-bearing member. The first and second strain gauges are symmetrically disposed about a line of symmetry on the outer surface of the load-bearing member. The line of symmetry extends substantially in the first direction, and a sensing axis of the first strain gauge is angularly offset from the line of symmetry by a first angle having a value between zero and 90°.

The computer-executable instructions are configured so that the computer-executable instructions, when executed by the processor, cause the processor to calculate a plurality of forces and torques acting on the load-bearing member at a load condition. The calculations are based on responses of the strain gauges to the load condition, and a rectangular matrix of predetermined calibration data relating the forces and torques to response characteristics of the strain gauges.

BRIEF DESCRIPTION OF THE DRAWINGS

Embodiments will be described with reference to the following drawing figures, in which like numerals represent like items throughout the figures and in which:

FIG. 12 depicts a mathematical operation by which various forces and moments are calculated by the sensor shown in FIGS. 3-11 based on a matrix of calibration coefficients and outputs of the circuits shown in FIG. 10;

FIG. 13 depicts a mathematical operation showing how the forces and moments calculated using the mathematical operation shown in FIG. 12 are not substantially affected by thermally-induced drift in the outputs of the circuits depicted in FIG. 10;

FIG. 14 depicts a mathematical operation by which an axial force is calculated by the sensor shown in FIGS. 3-11 based on another matrix of calibration coefficients, outputs of the circuits shown in FIGS. 10 and 11, and the forces and moments determined using the mathematical operation shown in FIGS. 12 and 13;

FIG. 18 is a side view of the sensor shown in FIGS. 15-17, depicting a flexure of the sensor separate from its adjacent structure;

FIG. 19 is a magnified perspective view of the area designated "C" in FIG. 18, depicting only two of the strain gauges of the sensor for clarity of illustration, and showing the cylindrical configuration of the flexure; and FIG. 20 depicts a mathematical operation by which various forces and moments are calculated by the sensor shown in FIGS. 15-19.

DETAILED DESCRIPTION

The inventive concepts are described with reference to the attached figures. The figures are not drawn to scale and they are provided merely to illustrate the instant inventive concepts. Several aspects of the inventive concepts are described} below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts. The inventive concepts is not limited by the illustrated ordering of acts or events, as some acts may occur in different orders and/or concurrently with other acts or events. Furthermore, not all illustrated acts or events are required to implement a methodology in accordance with the inventive concepts.

Figure 1:
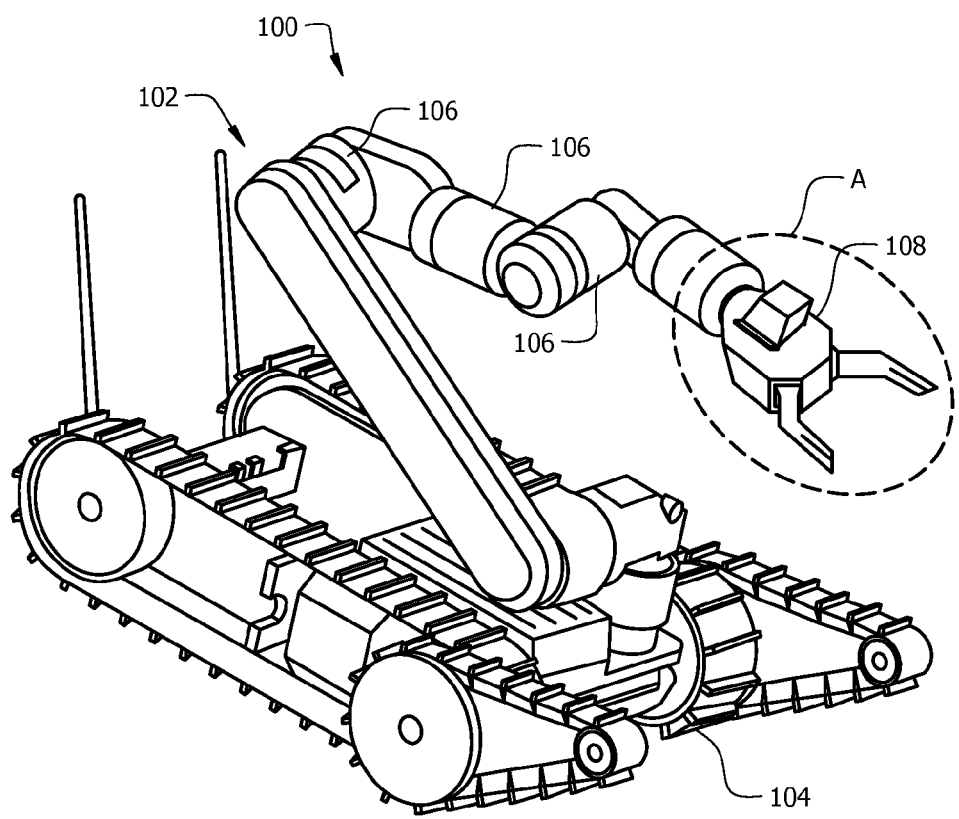
FIG. 1 is a perspective view of a robotic device comprising force and torque sensors.

The figures depict a force and torque sensor 10. The sensor 10 forms part of a robotic device 100, depicted in FIGS. 1-3. The robotic device 100 includes an arm 102 mounted on a body 104 as shown in FIG. 1. The arm 102 has multiple joints 106 about which portions of the arm 100 can articulate.

Figure 4:
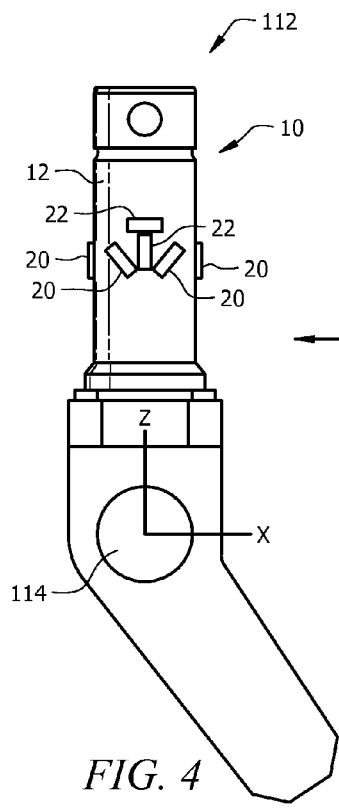
FIG. 4 is a side view of a support of the gripper shown in FIGS. 1-3, and one of the sensors shown in FIG. 3.
Figure 5:
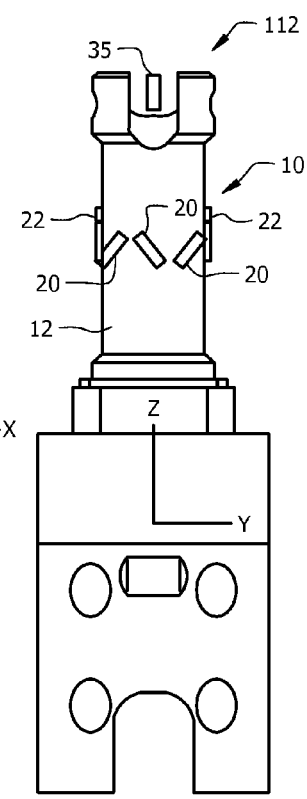
FIG. 5 is another side view of the support and sensor shown in FIGS. 3 and 4, rotated approximately 90° from the perspective of FIG. 4.
Figure 6:
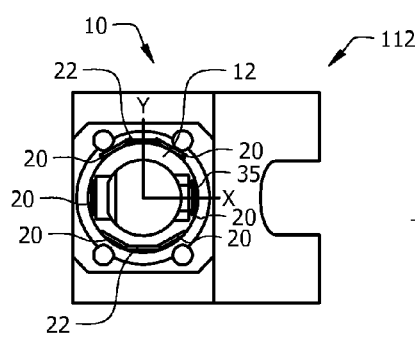
FIG. 6 is a top view of the support and sensor shown in FIGS. 3-5.

The robotic device 100 also includes a gripper 108 mounted on an end of the arm 102. The gripper 108 includes a body 110. The gripper 108 also includes two articulating supports 112 pivotally mounted on the body via respective pins 113 disposed in a circular opening 114 in the support. A respective sensor 10 is associated with each of the supports 112. One of the supports is depicted in detail in FIGS. 4-6.

Figure 7:
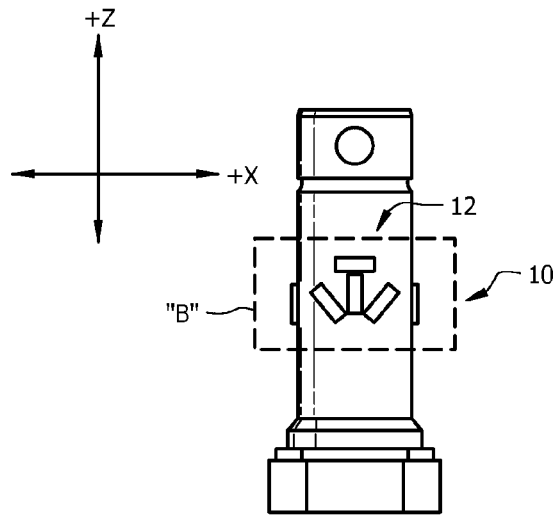
FIG. 7 is a side view of the sensor shown in FIGS. 3-6, depicting a flexure of the sensor separate from its adjacent structure.
Figure 8:
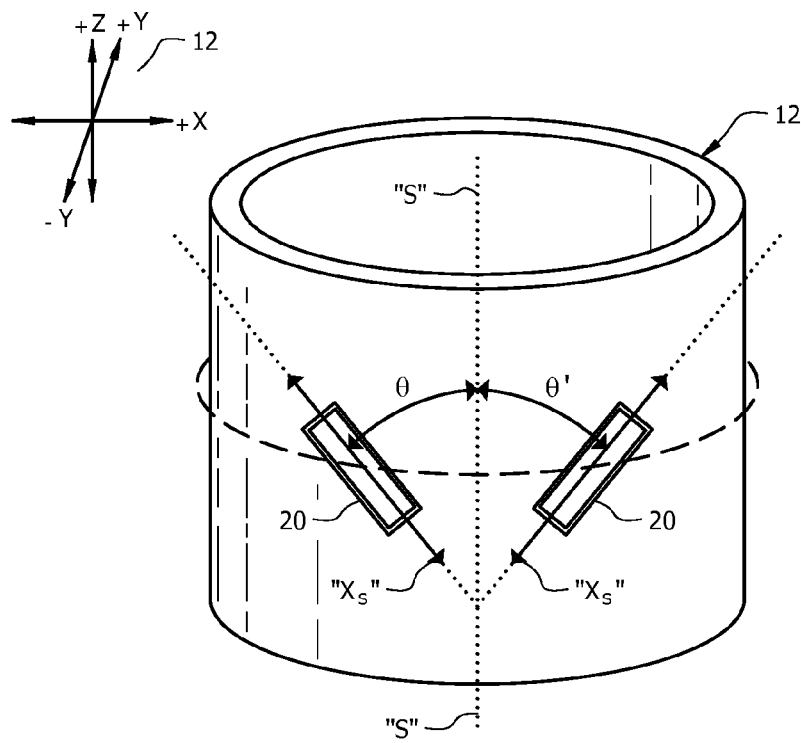
FIG. 8 is a magnified perspective view of the area designated "B" in FIG. 7, depicting only two of the strain gauges of the sensor for clarity of illustration, and showing the cylindrical configuration of the flexure.

A cylindrical end portion of each support 112 forms part of the sensor 10, and acts as a flexure 12, i.e., a load-bearing member the strain of which will be measured to determine the external forces, and external moments, i.e., torques acting on the sensor 10. The flexure 12 is depicted by itself in FIG. 7, and as part of its associated support 112 in FIGS. 4-6. Each gripper 108 also includes two fingers 116 securely mounted on an associated flexure 12 by a suitable means such as mechanical bolting, as shown in FIGS. 1-3.

Figure 2:
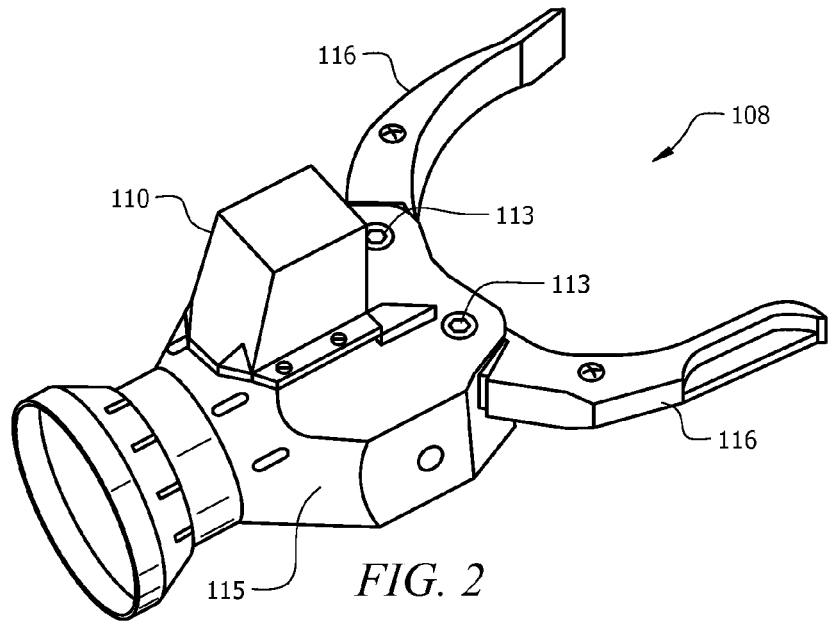
FIG. 2 is a magnified view of the area designated "A" in FIG. 1, depicting a gripper of the robotic device.
Figure 3:
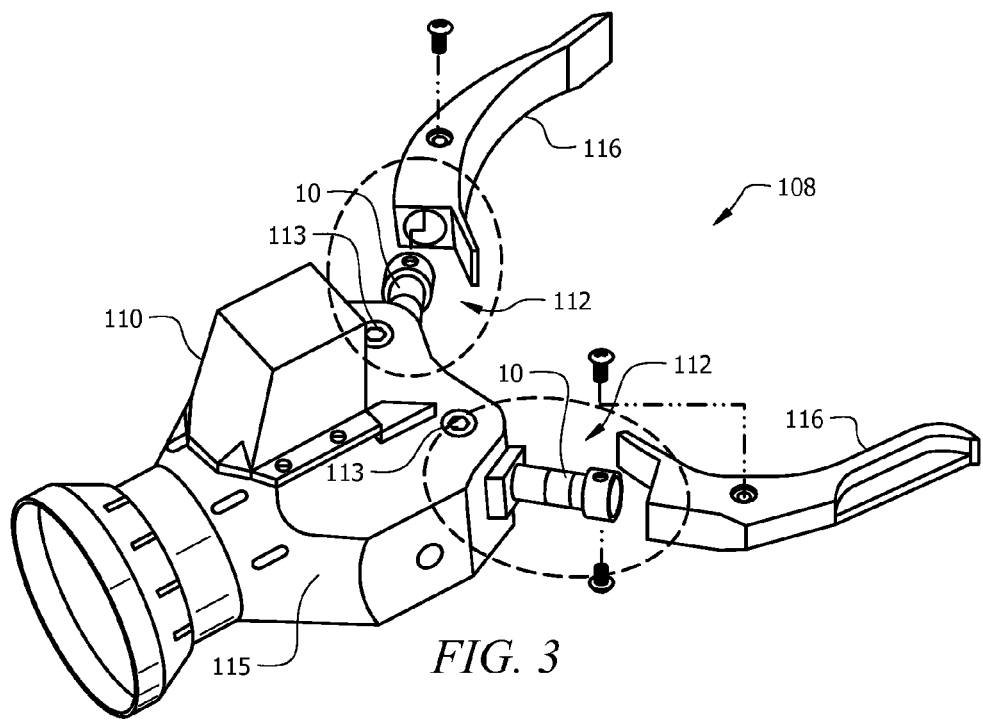
FIG. 3 is a perspective view of the gripper shown in FIGS. 1 and 2, with fingers of the gripper removed to reveal the force and torque sensors.

The gripper 108 also includes an electric motor 115, located inside of the gripper body 110 shown in FIGS. 2 and 3, that is activated in response to input from a control unit (not shown) mounted on the body 104 of the robotic device 100. Each support 112 is mechanically coupled to the motor 115 through a set of gears, and pivots about its associated mounting pin 113 in response to activation of the motor 115. The pivotal movement of the supports 112 causes the fingers 116 to move toward or away from each other. The fingers 116 can thus grasp and release objects in response to coordinated inputs from the control unit.

Each sensor 10 can measure three orthogonal external forces acting on its associated finger 116, and moments acting on the finger 116 about the three orthogonal axes. The force and moment information can be provided to the control unit of the robotic device 100, and can be used by the control unit as feedback to control the positions of the fingers 116 as the fingers grasp, hold, and release objects.

The use of the sensor 10 in connection with the gripper 108 and the robotic device 100 is disclosed for exemplary purposes only. The sensor 10, and variants thereof, can be used to measure forces and moments on other types of devices, including devices other than robotic devices.

The sensors 10 on each of the supports 112 are substantially identical. For clarity, the sensors 10 will be referred to hereinafter in the singular, and the following description applies to both of the sensors 10.

The flexure 12 of the sensor 10 has a substantially cylindrical configuration, and has a longitudinal axis that extends substantially in a "z" direction denoted by the orthogonal coordinate system 12 depicted in the figures. The flexure 12 can have a shape other than cylindrical in alternative embodiments, provided the shape can permit six or more strain gauges to be disposed symmetrically about, i.e., spaced equally from and oriented similarly in relation to, the longitudinal axis of the flexure 12. A cylindrical geometry is particularly advantageous, as cylinders area easy and cheap to manufacture, tend to be very strong, and have no irregular geometry that leads to undesirable stress concentrations within the flexure.

The sensor 10 further comprises six strain gauges 20 and four strain gauges 22, as depicted in FIGS. 4-8. The strain gauges 20, 22 are mounted on an outer surface of the flexure 12, using a suitable means such as epoxy. The strain gauges 20, 22 are mounted proximate a longitudinal, or z-axis midpoint of the flexure 12, so as to be positioned away from stress risers that can occur proximate the ends of the flexure 12. An even number of strain gauges 20 greater than six can be used in alternative embodiments. The strain gauges 20, 22 can be mounted a surface other than the outer surface of the flexure 12 in alternative embodiments. For example, the strain gages 20, 22 can be bonded to a inner surface of the flexure 12 in applications where the flexure 12 has a cylindrical configuration and is large enough to accommodate this type of mounting arrangement.

The strain gauges 20, and their respective gauge factors, are substantially identical to each other. The strain gauges 22 likewise are substantially identical to each other. The strain gauges 20 are substantially identical to the strain gauges 22, but can be different in alternative embodiments.

The respective outputs of the strain gauges 20 are used to determine the external loads or forces acting on the flexure 12 in the x and y directions, and the moments acting on the flexure 12 about axes extending in the x, y, and z directions. These forces and moments are referred to hereinafter as "$F_x$," "$F_y$," "$M_x$," "$M_y$," and the "$M_z$," respectively. The outputs of the second set 36 of strain gauges 22 are used to determine the forces acting on the flexure 12 in the axial or z direction. This force is referred to hereinafter as "$F_z$."

The strain gauges 20, 22 are foil-type strain gauges each comprising a metallic foil configured in a grid pattern and mounted on an electrically-insulative substrate or carrier. Each strain gauge 20, 22 also includes two electrically-conductive leads connected to opposite ends of the foil. The carrier of each strain gauge 20, 22 is bonded to the flexure 12 by a suitable means such as adhesive. The strain gauges 20, 22 can be wire strain gauges or semiconductor strain gauges in alternative embodiments. Each strain gauge 20, 22 has a sensing axis or principal axis of strain, i.e., an axis coincident with the direction in which the strain gauge 20, 22 is configured to measure strain in the object upon which the strain gauge 20, 22 is mounted. This axis is denoted in FIG. 8 by the reference symbol "$x_s$."

Figure 9:
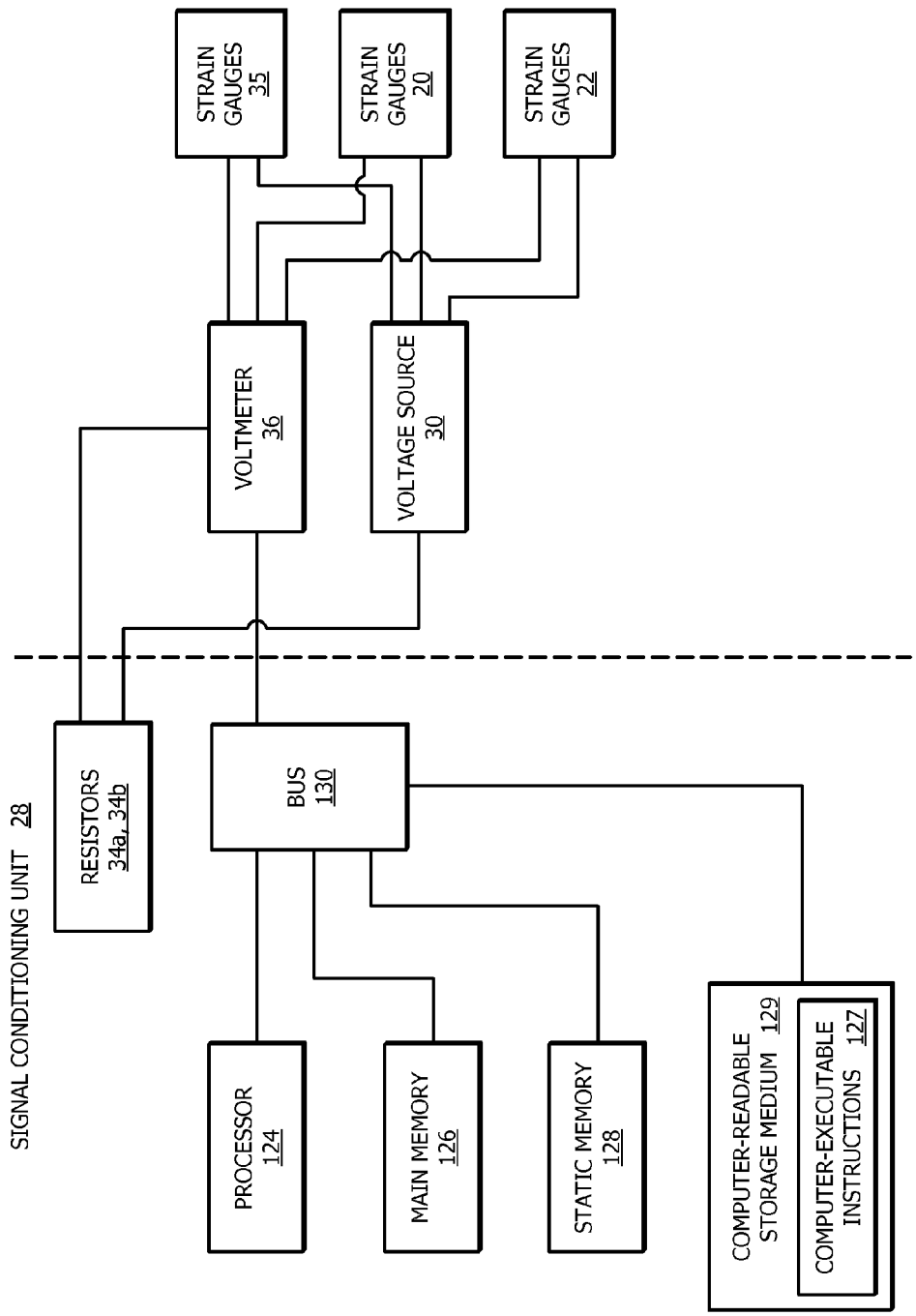
FIG. 9 is a schematic illustration depicting various electrical and electronic components of the sensor shown in FIGS. 3-8.

The system 10 further comprises a signal conditioning unit 28, depicted schematically in FIG. 9. The signal conditioning unit 28 can be mounted at a suitable location such as on the body of the robotic device 100. The signal conditioning unit 28 comprises a voltage source 30, six sets of resistors 34a, 34b, and a voltmeter 36. The resistors 34a, 34b have respective resistance values $R_1$, $R_2$. Each strain gauge 20 is associated with a respective one of the sets of resistors 34a, 34b.

The sensor 10 further includes six strain gauges 35. The strain gauges 35, as discussed below, are so-called "dummy" strain gauges used for thermal compensation. Each strain gauge 35 has a nominal resistance value $R_3$, and is associated with a respective one of the strain gauges 20 and a respective set of resistors 34a, 34b. Each associated set of resistors 34a, 34b, strain gauge 35, and strain gauge 20, along with the voltage source 30 and the voltmeter 36, form a circuit 38. One of the six circuits 38 is illustrated schematically in FIG. 10. Alternative embodiments can incorporate a single dummy gage as part of a half-bridge reference circuit, as opposed to the use of a dummy gage for each strain gage circuit as in the sensor 10.

Figure 10:
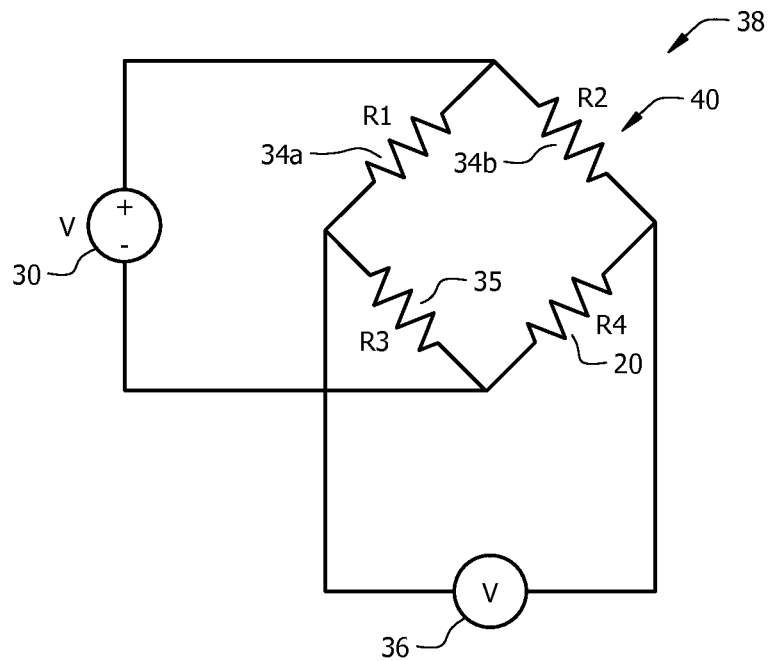
FIG. 10 is a schematic illustration of a circuit of the sensor shown in FIGS. 3-9.

The strain gauge 20, strain gauge 35, and resistors 34a, 34b of each circuit 38 are interconnected so as to form a Wheatstone bridge 40 of the quarter-bridge type, as shown in FIG. 10. The voltage source 30 is electrically connected to each circuit 38 as shown in FIG. 10, so that the voltage source 30 applies an excitation voltage across the associated bridge 40. The voltage can be, for example, a five-volt stabilized direct-current (DC) voltage. The voltmeter 36 is electrically connected to each circuit 38 as shown in FIG. 10, so that the voltmeter 36 measures the voltage potential across the bridge 40.

The resistance of each strain gauge 20 changes in response to the external forces and moments applied to the flexure 12. This change in resistance causes an imbalance in the Wheatstone bridge 40 of the associated circuit 38, which in turn results in a voltage output across the bridge 40 as measured by the voltmeter 36. The voltage output can be related to the magnitude and direction of the force or moment acting on the flexure 12 by a set of predetermined calibration factors, discussed below. The voltage outputs of the circuits 38 associated with each of the six strain gauges 20 are referred to hereinafter as $v_1$, $v_2$, $v_3$, $v_4$, $v_5$, and $v_6$, respectively.

The respective resistance values $R_1$, $R_2$, and $R_3$ of the resistors 34a, 34b and the strain gauge 35 are selected so that the Wheatstone bridge 40 of the associated circuit 38, ideally, is balanced, i.e., the voltage potential across the associated bridge 40 is approximately zero, when no external forces or moments are being applied to the flexure 12. In particular, the resistance values $R_1$ and $R_2$ are selected so as to be approximately equal, and the resistance $R_3$ is selected so as to be approximately equal to the resistance of the associated strain gauge 20 when the flexure 12 is under a no-load, i.e., zero-strain, condition.

The output voltage of the Wheatstone bridge 40 may be non-zero when the flexure 12 is under a no-load condition, due to factors such as tolerances in the resistance values $R_1$ and $R_2$, strain induced in the strain gauge 20 by the mounting thereof on the flexure 12, thermal effects, etc. This offset voltage can be compensated for using suitable techniques, such as an offset-nulling or balancing circuit (not shown) electrically connected to each bridge 40 and configured to provide a voltage that substantially cancels the offset voltage. Alternatively, compensation for the offset voltage can be achieved though software that applies a correction to the output voltage of the each circuit 38, based on the offset voltage measured prior to the application of any external forces or moments to the flexure 12.

The resistors 34a, 34b can be housed within the signal conditioning unit 28, as depicted in FIG. 9. The dummy strain gauges 35 can be mounted at locations proximate the strain gauges 20, so as to provide compensation for drift in the output voltages $v_1$-$v_6$ caused by heating or cooling of the portion of flexure 12 that the strain gauges 20 themselves are bonded to. In particular, the location for each dummy strain gauge 35 can be selected so that the strain gauge 35 is subject to approximately the same temperature as the associated strain gauge 20, but is not subjected to the strain induced in the flexure 12 due to the external forces and moments acting thereon. For example, the strain gauges 35 can be mounted on the support 112 at the location depicted in FIGS. 4 and 6. It is believed that this particular location on the support 112 is not subject to substantial mechanical strain during normal operation of the gripper 108. Because any drift in the response of a particular strain gauge 20 due to the changes in the temperature thereof will be substantially matched by the drift in its corresponding dummy gauge 35, such thermally-induced drift will not affect the balance, or the resulting voltage output of the corresponding Wheatstone bridge 40. Alternative embodiments of the sensor 10 can be configured without dummy strain gauges 35.

The strain gauges 20 are mounted on the flexure 12 so that the sensing axes $x_s$ thereof are angled in relation to the "z" direction, and the respective mid-points of adjacent strain gauges 20 are equally spaced. Moreover, the strain gauges 20 are disposed symmetrically about the longitudinal or z axis of the flexure 12, i.e., the strain gauges 20 are spaced equally from, and are oriented similarly in relation to the longitudinal axis.

Adjacent strain gauges 20 are symmetrically disposed substantially about an associated imaginary reference line, or line of symmetry, on the outer surface of the flexure 12. The imaginary lines of symmetry are denoted in FIG. 8 by the symbol "s," and extend substantially in the axial or z direction. In particular, three of the strain gauges 20 are mounted so that the sensing axes $x_s$ thereof are angularly offset from the associated line of symmetry "s" by an angle between 0 and +90 degrees; this angle is denoted in FIG. 8 by the reference character "θ." The other three strain gauges 20 are mounted so that the sensing axes $x_s$ thereof are angularly offset from the associated line of symmetry "s" by an angle approximately equal in magnitude to, and opposite in direction from the angle "θ;" this offset angle is denoted in FIG. 8 by the reference character "θ'." Moreover, the strain gauges 20 oriented at the angle θ and the strain gauges 20 oriented at the angle θ' are arranged in an alternating manner around the circumference of the flexure 12. Thus, as can be seen from FIGS. 4-8, the strain gauges 20 are arranged in three pairs, with the strain gauges 20 of each pair forming a mirror image about their associated line of symmetry "s."

The angles θ, θ' can be, for example, approximately +45° and approximately −45°, respectively. The optimal or desired values for θ and θ' can vary by application. In particular, the magnitudes of θ and θ' affect the sensitivities of the strain gauges 20 to forces applied to the flexure 12 in the x and y directions, and to moments applied to the flexure 12 about axes extending in the x, y, and z directions. Increasing the respective magnitudes of the angles θ, θ', i.e., making the angle θ more positive and the angle θ' more negative, increases the sensitivities of the strain gauges 20 to forces applied in the x and y directions, and to moments applied about the z-direction axis, while decreasing the sensitivities of the strain gauges 20 to moments applied about the x-direction and y-direction axes. Decreases in the respective magnitudes of the θ and θ' have the opposite effect on the noted sensitivities.

The symmetric arrangement of the strain gauges 20 make the external forces and moments $F_x$, $F_y$, $M_x$, $M_y$, and $M_z$ determined by the sensor 10 substantially insensitive to drift due to thermally-induced deflection of the flexure 12. In particular, because of the above-described orientations of the strain gauges 20, each of the six strain gauges 20 will be affected in a substantially identical manner by thermally-induced expansion or contraction of the flexure 12. Thus, any thermally-induced drift in the output voltages $v_1$-$v_6$ of the six circuits 38 will be approximately equal. Because the magnitude of the angle of each gage with respect to the z direction is substantially the same, an applied force of $F_z$ in the z direction will cause a substantially identical strain in each of the gages. Thus, because thermal strain will result in the same voltage output that a force in the z direction would cause, thermal strain will have no effect on the values of $F_x$, $F_y$, $M_x$, $M_y$, and $M_z$ as determined by the sensor 10. Thus the thermally-induced drift in the output voltages $v_1$-$v_6$ will not substantially affect the resulting values of $F_x$, $F_y$, $M_x$, $M_y$, and $M_z$ as determined by the sensor 10 due to the physical arrangement of the strain gages 20.

FIG. 12 depicts a five by six transformation, or calibration matrix $C_1$ that can be used to determine the external forces and moments $F_x$, $F_y$, $M_x$, $M_y$, and $M_z$ based the measured voltage outputs $v_1$-$v_6$ of the circuits 38. The matrix $C_1$ can be generated, for example, using a conventional calibration process in which a series of known physical loads, each spanning a predetermined range, are applied to the flexure 12 in the x and y directions while the response of each circuit 38 to each load is measured and recorded. A series of known physical moments, each spanning a predetermined range, can also be applied to the flexure 12 about the x, y and z axes while the response of each circuit 38 to each moment is measured and recorded.

The applied external forces and moments $F_x$, $F_y$, $M_x$, $M_y$, and $M_z$ can be related to the responsive voltages $v_1$-$v_6$ measured during the calibration process through a series of calibration factors developed using a suitable technique such as a least squares curve fit. This results in a five by six matrix $C_1$ of calibration factors, through which the outputs $F_x$, $F_y$, $M_x$, $M_y$, and $M_z$ for a given load condition can be determined based on the measured values of $v_1$-$v_6$ at that condition, as depicted in FIG. 12. In addition, an associated constant $b_1$, determined during the calibration process, can be added to each output of the matrix $C_1$ to compensate for systematic offset or bias in $F_x$, $F_y$, $M_x$, $M_y$, and $M_z$.

As noted above, the external forces and moments $F_x$, $F_y$, $M_x$, $M_y$, and $M_z$ as determined by the sensor 10 are substantially insensitive to shifts in the output voltages $v_1$-$v_6$ caused by thermally-induced expansion or contraction of the flexure 12. This insensitivity stems from the use of the rectangular calibration matrix $C_1$ in which the number of input vectors (six) exceeds the number of output vectors (five). In particular, because the matrix $C_1$ is a rectangular matrix that defines five vector outputs based on six vector inputs, the matrix $C_1$ has a nullspace. Due to the common value of the thermally-induced changes or deltas in the outputs $v_1$-$v_6$ of the load cells 20, the series of voltage deltas be conceptualized as a null or zero vector that, when input to the matrix $C_1$, does not have any effect on the output of the matrix $C_1$. This concept is depicted mathematically in FIG. 13. In other words, the vector $[1\ 1\ 1\ 1\ 1\ 1]^T$ lies in the nullspace of the matrix $C_1$, and thermally-induced changes in the outputs $v_1$-$v_6$ of the load cells 20 results in a change in the outputs $v_1$-$v_6$ of the amount $\Delta v$, where $\Delta v = d*[1\ 1\ 1\ 1\ 1\ 1]^T$, (where d is an arbitrary scalar value) then the thermal strain causes no change in the measured forces and moments because $\Delta v$ lies in the nullspace of the matrix $C_1$ (i.e. $C_1*\Delta v = [0\ 0\ 0\ 0\ 0]^T$).

Figure 11:
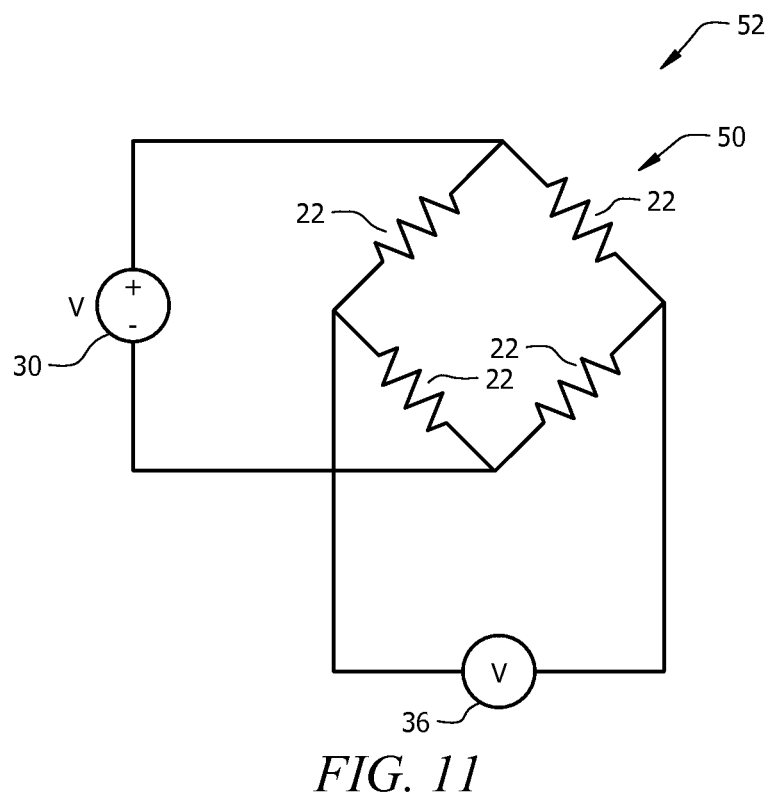
FIG. 11 is a schematic illustration of another circuit of the sensor shown in FIGS. 3-10.
Figure 15:
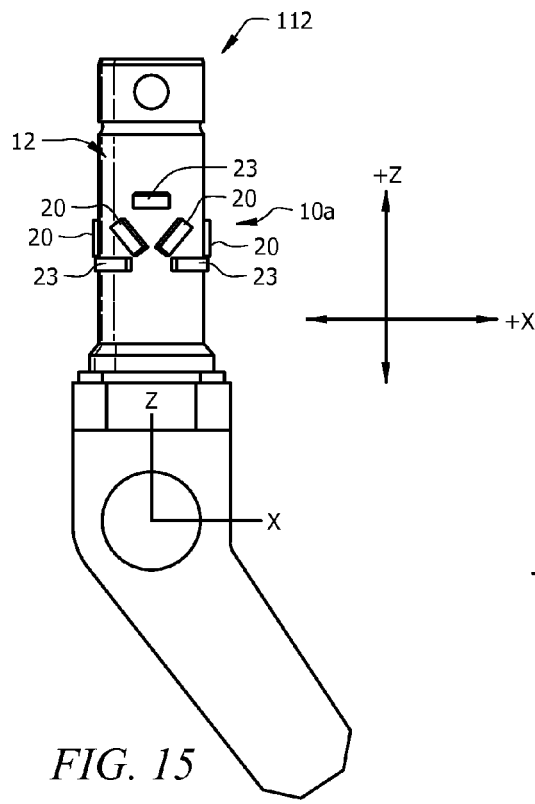
FIG. 15 is a side view of a support that includes an alternative embodiment of the sensor shown in FIGS. 3-11.
Figure 16:
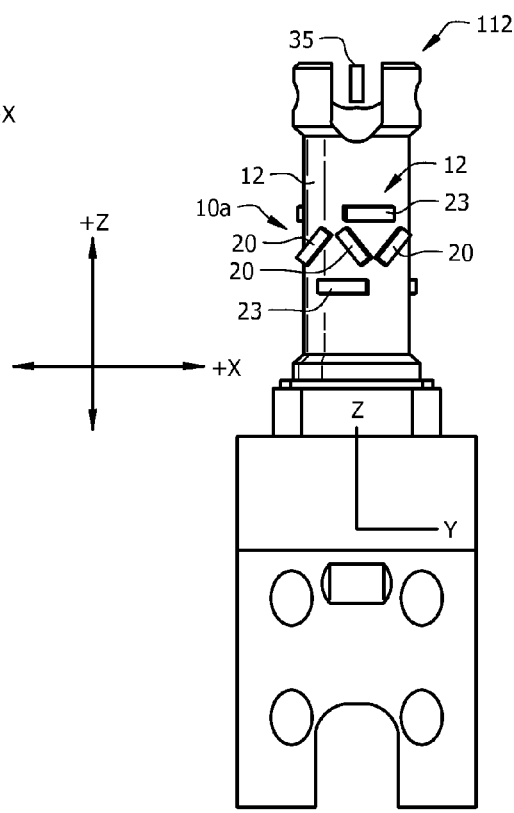
FIG. 16 is another side view of the support and sensor shown in FIG. 15, rotated approximately 90° from the perspective of FIG. 15.
Figure 17:
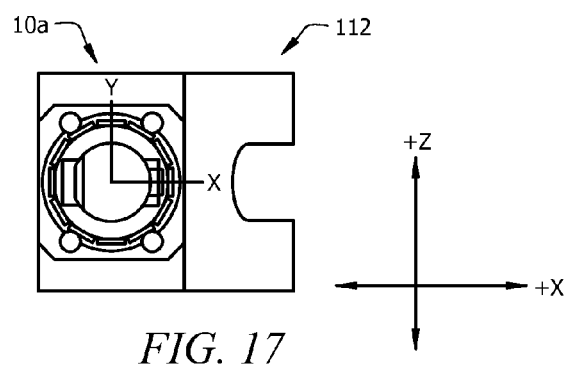
FIG. 17 is a top view of the support and sensor shown in FIGS. 15 and 16.

The four strain gauges 22, as noted above, are used to determine the z-direction force, or $F_z$, acting on the flexure 12. The strain gauges 22 are electrically connected so that each strain gauge 22 forms one leg of a full-bridge Wheatstone bridge 50, as depicted schematically in FIG. 11. The bridge 50 is electrically connected to the voltage source 30, which applies an excitation voltage across the associated bridge 50. The voltage can be, for example, a five-volt stabilized direct-current (DC) voltage. The bridge 50 is also electrically connected to the voltmeter 36, which measures the voltage potential across the bridge 50. This potential is referred to hereinafter as "$v_z$." The four strain gauges 22, along with the voltage source 30 and the voltmeter 36, form a circuit 52 as shown in FIG. 11.

The strain gauges 22 are arranged in two pairs located at diametrically opposed locations on the outer circumference of the flexure 12, and at axial (z-axis) locations proximate the strain gauges 20, as depicted in FIGS. 4-7. Each pair of strain gauges 22 is disposed in a substantially T-shaped pattern. In particular, the strain gauges 22 are positioned so that the sensing axis $x_s$ of one of the strain gauges 22 in each pair extends substantially in the axial or z direction, and the sensing axis $x_s$ of the other strain gauge 22 in the pair is substantially perpendicular to the z direction. This arrangement is commonly known as a Poisson arrangement, and makes the voltage output of the circuit 52 substantially immune to drift resulting from thermal deflection of the flexure 12 in the axial or z direction.

FIG. 14 depicts a one by six calibration matrix $C_2$ that can be used to determine the external force $F_z$ based on $F_x$, $F_y$, $M_x$, $M_y$, $M_z$, and the measured voltage $v_z$ of the circuit 52. The matrix $C_2$ can be generated, for example, using a calibration process in which a series of known physical loads, each spanning a predetermined range, are applied to the flexure 12 in the z direction while the response of the circuit 52 to the loads, i.e., the voltage $v_z$, is measured and recorded. In addition, for each calibration load applied in the z direction, corresponding values for $F_x$, $F_y$, $M_x$, $M_y$, $M_z$ can be determined in the above-described manner based on the responses of the six strain gauges 20, i.e., based on the voltages $v_1$-$v_6$.

The applied external forces $F_z$ can be related to the responsive output voltages $v_z$, and to the values of $F_x$, $F_y$, $M_x$, $M_y$, $M_z$ calculated during the calibration process through a series of calibration factors developed using a suitable technique such as a least squares curve fit. This results in a one by six matrix $C_2$ of calibration factors through which $F_z$ at a given load condition can be calculated based on $v_z$, $F_x$, $F_y$, $M_x$, $M_y$, $M_z$ at that load condition, as depicted in FIG. 14. In addition, a constant $b_2$, determined during the z-axis calibration process, can be added to the output of the matrix $C_2$ to compensate for systematic offset or bias in $F_z$.

The positioning of the strain gauges 22 in a Poisson arrangement, and the above-described interconnection of the strain gauges 22 in a full-bridge Wheatstone bridge 50 make the output voltage $v_z$ substantially immune from drift caused by thermally-induced deflection of the flexure 12. As discussed above, the noted arrangement of the strain gauges 20 likewise make the output voltages $v_1$-$v_6$, and the values of $F_x$, $F_y$, $M_x$, $M_y$, $M_z$ based thereon, substantially immune from drift caused by thermally-induced deflection of the flexure 12. Thus, the determination of $F_z$ is substantially immune from error based on thermally-induced deflection of the flexure 12.

As is evident from the above, the force and moment sensing provided by the sensor 10 is a two-step process. In the first step, $F_x$, $F_y$, $M_x$, $M_y$, $M_z$ are determined for a given load condition using the voltage outputs $v_1$-$v_6$ measured at that condition, and the predetermined calibration matrix $C_1$. In the second step, $F_z$ for the same load condition is determined based on the values of $F_x$, $F_y$, $M_x$, $M_y$, $M_z$ determined in the first step, the voltage output $v_z$ of the circuit 52 measured at that condition, and the predetermined calibration matrix $C_2$.

Processing of the voltage inputs $v_1$-$v_6$ and $v_z$ to produce the outputs $F_x$, $F_y$, $F_z$, $M_x$, $M_y$, and $M_z$ can be performed by the signal conditioning unit 28. In particular, as shown in FIG. 9, the signal conditioning unit 28 includes a processor 124, such as a central processing unit (CPU), a main memory 126, and a static memory 128 which communicate with each other via a bus 130. The processor 124 is communicatively coupled to the circuits 38, 52, and the load cells 20, 22 therein, by way of the bus 130 and the voltage meter 36.

The signal conditioning unit 28 includes additional memory in the form of a computer-readable storage medium 126 on which is stored one or more sets of computer-executable instructions 127, e.g., software code, configured to implement one or more of the methodologies, procedures, or functions described herein. The instructions 127 can also reside, completely or at least partially, within the main memory 126, the static memory 128, and/or within the processor 124 during execution of the instructions 127 by the processor 124. The main memory 126 and the processor 124 also can include machine-readable media. The computer-executable instructions 127 are configured so that the instructions, 127, when executed by the processor 124, cause the processor to calculate $F_x$, $F_y$, $F_z$, $M_x$, $M_y$, $M_z$ in the above-described manner based on the outputs $v_1$-$v_6$ and $v_z$ of the load cells 20, 22.

The term "computer-readable storage medium" shall also be taken to include any medium that is capable of storing, encoding, or carrying a set of instructions for execution by the processor 124 and that cause the processor 124 to perform any one or more of the methodologies, procedures, or functions described herein. The term "computer-readable storage medium" shall be taken to include, but not be limited to, solid-state memories such as a memory card or other package that houses one or more read-only (non-volatile) memories, random access memories, or other re-writable (volatile) memories; and/or magneto-optical or optical medium such as a disk or tape.

Those skilled in the art will appreciate that the system architecture illustrated in FIG. 9 is one possible example of a signal processing apparatus configured in accordance with the inventive concepts disclosed herein. The invention is not limited in this regard and any other suitable computer system architecture can also be used without limitation.

The geometry and overall configuration of the sensor 10 are relatively simple, compact, and robust. For example, conventional force and torque sensors capable of multi-axis force and torque measurement may require up to twice as many strain gauges as the sensor 10. Moreover, the flexure 12 of the sensor 10 can be formed with a relatively simple geometry, such as the cylindrical shape discussed above. This simple geometry can potentially allow the flexure 12 to be more compact and robust in comparison to conventional flexures commonly used in other types of multi-axis force and torque sensors. The relatively simple geometry can also allow the flexure 12 to readily be integrated into other structures, such as the supports 112 of the grippers 108. Conventional flexures, by contrast, often have complex shapes and contours, and may include relatively thin sections that can potentially affect the load-bearing capability, life, and durability of the flexure.

Furthermore, the relatively simple geometry of the flexure 12 allows the strain gauges 20, 22 to be mounted away from the ends of the flexure 12, where stress risers can potentially exert an adverse affect on the readings from any strain gauges mounted thereabout. The geometry of the flexure 12 also allows the flexure 12 to be scaled down for applications in which the measured forces and moments will be relatively small, without making the flexure thin and non-robust.

FIGS. 15-19 depict an alternative embodiment of the sensor 10 in the form of a sensor 10a. Components of the sensor 10a that are substantially identical to those of the sensor 10 are denoted by identical reference characters. The sensor 10a includes an alternative strain-gauge configuration for use in the determination of $F_z$. In particular, the sensor 10 includes six strain gauges 23 in lieu of the strain gauges 22. The strain gauges 23 are mounted on the flexure 12 of the sensor 10a so that the sensing axis $x_s$ of each strain gauge 23 is substantially perpendicular to the z direction, i.e., the sensing axes $x_s$ are substantially transverse to the longitudinal or lengthwise direction of the flexure 12. Three of the strain gauges 23 are located at a first axial location on the flexure 12, below the axial location of the strain gauges 20, from the perspective of FIG. 15, and are equally spaced along the circumference of the flexure 12. The other three strain gauges 23 are located at a second axial location on the flexure 12, above the axial location of the strain gauges 20, and are equally spaced along the circumference of the flexure 12.

Each of the six strain gauges 23 is part of a respective circuit that is substantially identical to the circuits 38. Each of the six circuits generates a respective output, referred to hereinafter as $v_7$, $v_8$, $v_9$, $v_{10}$, $v_{11}$, and $v_{12}$, in response to deflection of the associated strain gauge 23, in the manner discussed above in relation to the strain gauges 20 and the circuits 38.

Because the sensing axes $x_s$ of the strain gauges 23 are substantially perpendicular to the longitudinal or z axis the flexure 12, the strain gauges 23 respond differently to thermally-induced expansion of the flexure 12, and axial, or z-direction elongation of the flexure 12 in response to an external load applied in the axial direction. In particular, thermally-induced expansion of the flexure 12 will elongate the strain gauges 23, while axial elongation of the flexure 12 in response to an external axial load will compress the strain gauges 23. The strain gauges 20 will elongate in response to both thermally-induced expansion of the flexure 12, and axial elongation of the flexure 12 in response to an external axial load. Thus, the voltage vector made up of the output voltages $v_1$-$v_{12}$ will be different when the flexure 12 has undergone thermally-induced expansion as opposed to axial elongation in response to an externally-applied load.

As a result of these properties, a calibration matrix can be developed in which the resulting z-axis force measurement $F_z$ is substantially immune from drift caused by thermally-induced deflection of the flexure 12 in the z direction. In particular, FIG. 20 depicts a six by twelve calibration matrix $C_3$ that can be used to determine the external forces and moments $F_x$, $F_y$, $F_z$, $M_x$, $M_y$, and $M_z$ based the measured voltage outputs $v_1$-$v_6$ of the circuits 38, and the measured output voltages $v_7$-$v_{12}$ of the circuits associated with the load cells 23. The matrix $C_3$ can be generated, for example, using a conventional calibration process in which a series of known physical loads, each spanning a predetermined range, are applied to the flexure 12 in the x, y, and z directions while the responses of the associated circuits to each load are measured and recorded. A series of known physical moments, each spanning a predetermined range, can also be applied to the flexure 12 about the x, y and z axes while the responses of the associated circuits to each moment are measured and recorded.

The applied external forces and moments $F_x$, $F_y$, $F_z$, $M_x$, $M_y$, and $M_z$ can be related to the measured voltages $v_1$-$v_{12}$ through a series of calibration factors developed using a suitable technique such as a least squares curve fit. This results in a six by twelve matrix $C_3$ of calibration factors, through which the outputs $F_x$, $F_y$, $F_z$, $M_x$, $M_y$, and $M_z$ can be calculated based on the inputs $v_1$-$v_{12}$, as depicted mathematically in FIG. 20. In addition, constants $b_3$, determined during the calibration process, can be added to each output of the matrix $C_3$ to compensate for systematic offset or bias in $F_x$, $F_y$, $F_z$, $M_x$, $M_y$, and $M_z$. Moreover, the calibration matrix $C_3$ can be chosen such that if a change in temperature $\Delta t$ of the flexure 12 causes thermal strains in all gages, resulting in a change $\Delta v$ of the voltages $v_1$-$v_{12}$, where $\Delta v = [\Delta v_1, \Delta v_2, \ldots, \Delta v_{12}]^T$, the resulting change in measured forces and moments is zero (i.e. $C_3^*[\Delta v_1, \Delta v_2, \ldots, \Delta v_{12}]^T = [0\,0\,0\,0\,0\,0]^T$. This ensures thermal immunity of the measurement system.

We claim:

1. A sensor for measuring forces and torques, comprising:
a load-bearing member having a longitudinal axis extending in a first direction;
a plurality of strain gauges including first and second strain gauges mounted on a surface of the load-bearing member; where
the first and second strain gauges are symmetrically disposed about a line of symmetry on the surface of the load-bearing member, the line of symmetry extending substantially in the first direction, and
a sensing axis of the first strain gauge is angularly offset from the line of symmetry by a first angle having a value between zero and 90°;
a processor computing values for said forces and torques acting on the load-bearing member based on (1) outputs of the plurality of strain gauges, (2) a calibration matrix of predetermined calibration data relating the forces and torques to response characteristics of the plurality of strain gauges, and (3) a calibration constant selected to compensate for systematic offset or bias in the forces and torques.

2. The sensor of claim 1, wherein a sensing axis of the second strain gauge is angularly offset from the line of symmetry by a second angle substantially equal in magnitude to and substantially opposite in direction from the first angle.

3. The sensor of claim 2, wherein the plurality of strain gauges further comprises
third, fourth, fifth, and sixth strain gauges mounted on the surface of the load-bearing member, where
the third and fourth strain gauges are symmetrically disposed about a second line of symmetry on the surface of the load-bearing member,
the second line of symmetry extends substantially in the first direction,
the fifth and sixth strain gauges are symmetrically disposed about a third line of symmetry on the surface of the load-bearing member, and
the third line of symmetry extends substantially in the first direction.

4. The sensor of claim 3, wherein the forces comprise forces acting on the load-bearing member in two orthogonal directions each substantially perpendicular to the first direction, and the torques comprise torques acting on the load-bearing member about respective axes extending substantially in the first direction and in the two orthogonal directions.

5. The sensor of claim 4, wherein the plurality of strain gauges further comprises
seventh, eighth, ninth, and tenth strain gauge mounted on the surface of the load-bearing member and communicatively coupled to the processor, where
the seventh and eighth strain gauges are mounted in a substantially T-shaped pattern at a first circumferential position on the surface of the load-bearing member,
a sensing axis of the seventh strain gauge extends substantially in the first direction,
a sensing axis of the eighth strain gauge is substantially perpendicular to the sensing axis of the ninth strain gauge,
the ninth and tenth strain gauges are mounted in a substantially T-shaped pattern at a second circumferential position on the surface of the load-bearing member,
the second circumferential position is substantially diametrically opposite the first circumferential position,
a sensing axis of the ninth strain gauge extends substantially in the first direction, and
a sensing axis of the tenth strain gauge is substantially perpendicular to the sensing axis of the third strain gauge.

6. The sensor of claim 3, wherein the plurality of strain gauges further comprises
seventh, eighth, ninth, tenth, eleventh, and twelfth strain gauges mounted on the surface of the load-bearing member so that a sensing axis of each of the seventh thru twelfth strain gauges is substantially perpendicular to the first direction.

7. A sensor for measuring forces and torques, comprising:
a load-bearing member having a longitudinal axis extending in a first direction;
a first and a second strain gauge mounted on a surface of the load-bearing member, where
the first and second strain gauges are symmetrically disposed about a line of symmetry on the surface of the load-bearing member, the line of symmetry extending substantially in the first direction, and
a sensing axis of the first strain gauge is angularly offset from the line of symmetry by a first angle having a value between zero and 90°;
a third, a fourth, a fifth, and a sixth strain gauge mounted on the surface of the load-bearing member, where
the third and fourth strain gauges are symmetrically disposed about a second line of symmetry on the surface of the load-bearing member,
the second line of symmetry extends substantially in the first direction,
the fifth and sixth strain gauges are symmetrically disposed about a third line of symmetry on the surface of the load-bearing member, and
the third line of symmetry extends substantially in the first direction;
a processor communicatively coupled to the first, second, third, fourth, fifth, and sixth strain gauges; and
a memory communicatively coupled to the processor; and computer-executable instructions stored on the memory;
wherein a sensing axis of the second strain gauge is angularly offset from the line of symmetry by a second angle substantially equal in magnitude to and substantially opposite in direction from the first angle;
wherein the computer-executable instructions are configured so that the computer-executable instructions, when executed by the processor, cause the processor to calculate values of forces acting on the load-bearing member in two orthogonal directions each substantially perpendicular to the first direction, and values of torques acting on the load-bearing member about respective axes extending substantially in the first direction and in the two orthogonal directions, the calculations being based on outputs of the first, second, third, fourth, fifth, and sixth strain gauges, and a matrix of predetermined calibration data relating the forces and the torques to response characteristics of the first, second, third, fourth, fifth, and sixth strain gauges;
wherein the matrix of predetermined calibration data is a five by six matrix having five rows and six columns of the predetermined calibration data.

8. A sensor for measuring forces and torques, comprising:
a load-bearing member having a longitudinal axis extending in a first direction;

a first and a second strain gauge mounted on a surface of the load-bearing member, where
  the first and second strain gauges are symmetrically disposed about a line of symmetry on the surface of the load-bearing member, the line of symmetry extending substantially in the first direction, and
  a sensing axis of the first strain gauge is angularly offset from the line of symmetry by a first angle having a value between zero and 90°;
a third, a fourth, a fifth, and a sixth strain gauge mounted on the surface of the load-bearing member, where
  the third and fourth strain gauges are symmetrically disposed about a second line of symmetry on the surface of the load-bearing member,
  the second line of symmetry extends substantially in the first direction,
  the fifth and sixth strain gauges are symmetrically disposed about a third line of symmetry on the surface of the load-bearing member, and
  the third line of symmetry extends substantially in the first direction;
a processor communicatively coupled to the first, second, third, fourth, fifth, and sixth strain gauges;
a memory communicatively coupled to the processor;
computer-executable instructions stored on the memory;
a seventh, an eighth, a ninth, and a tenth strain gauge mounted on the surface of the load-bearing member and communicatively coupled to the processor, where
  the seventh and eighth strain gauges are mounted in a substantially T-shaped pattern at a first circumferential position on the surface of the load-bearing member,
  a sensing axis of the seventh strain gauge extends substantially in the first direction,
  a sensing axis of the eighth strain gauge is substantially perpendicular to the sensing axis of the ninth strain gauge,
  the ninth and tenth strain gauges are mounted in a substantially T-shaped pattern at a second circumferential position on the surface of the load-bearing member,
  the second circumferential position is substantially diametrically opposite the first circumferential position,
  a sensing axis of the ninth strain gauge extends substantially in the first direction, and
  a sensing axis of the tenth strain gauge is substantially perpendicular to the sensing axis of the third strain gauge;
wherein a sensing axis of the second strain gauge is angularly offset from the line of symmetry by a second angle substantially equal in magnitude to and substantially opposite in direction from the first angle;
wherein the computer-executable instructions are configured so that the computer-executable instructions, when executed by the processor, cause the processor to calculate values of forces acting on the load-bearing member in two orthogonal directions each substantially perpendicular to the first direction, and values of torques acting on the load-bearing member about respective axes extending substantially in the first direction and in the two orthogonal directions, the calculations being based on outputs of the first, second, third, fourth, fifth, and sixth strain gauges, and a matrix of predetermined calibration data relating the forces and the torques to response characteristics of the first, second, third, fourth, fifth, and sixth strain gauges;
wherein the computer-executable instructions are further configured so that the computer-executable instructions, when executed by the processor, cause the processor to calculate values for a force acting on the load-bearing member in the first direction based on outputs of the seventh, eighth, ninth, and tenth strain gauges, the calculated values of the forces acting on the load-bearing member in the two orthogonal directions, the calculated values of the torques acting on the load-bearing member about the respective axes extending substantially in the first direction and in the two orthogonal directions, and a second matrix of predetermined calibration data.

9. The sensor of claim 8, wherein the second matrix of predetermined calibration data is a one by six matrix having one row and six columns of the predetermined calibration data.

10. A sensor for measuring forces and torques, comprising:
a load-bearing member having a longitudinal axis extending in a first direction;
a first and a second strain gauge mounted on a surface of the load-bearing member, where
  the first and second strain gauges are symmetrically disposed about a line of symmetry on the surface of the load-bearing member, the line of symmetry extending substantially in the first direction, and
  a sensing axis of the first strain gauge is angularly offset from the line of symmetry by a first angle having a value between zero and 90°;
a third, a fourth, a fifth, and a sixth strain gauge mounted on the surface of the load-bearing member, where
  the third and fourth strain gauges are symmetrically disposed about a second line of symmetry on the surface of the load-bearing member,
  the second line of symmetry extends substantially in the first direction,
  the fifth and sixth strain gauges are symmetrically disposed about a third line of symmetry on the surface of the load-bearing member, and
  the third line of symmetry extends substantially in the first direction;
a processor communicatively coupled to the first, second, third, fourth, fifth, and sixth strain gauges;
a memory communicatively coupled to the processor; and computer-executable instructions stored on the memory; and
a seventh, an eighth, a ninth, a tenth, an eleventh, and a twelfth strain gauge mounted on the surface of the load-bearing member so that a sensing axis of each of the seventh thru twelfth strain gauges is substantially perpendicular to the first direction;
wherein a sensing axis of the second strain gauge is angularly offset from the line of symmetry by a second angle substantially equal in magnitude to and substantially opposite in direction from the first angle;
wherein each of the seventh thru twelfth strain gauges is communicatively coupled to the processor;
wherein the seventh, eighth, and ninth strain gauges are located at a first axial position on the load-bearing member above an axial position of the first thru sixth strain gauges on the load-bearing member; and
wherein the tenth, eleventh, and twelfth strain gauges are located at a second axial position on the load-bearing member below the axial position of the first thru sixth strain gauges on the load-bearing member.

11. The sensor of claim 10, wherein the seventh, eighth, and ninth strain gauges are equally spaced with respect to each other around a circumference of the load-bearing element; and the tenth, eleventh, and twelfth strain gauges are equally spaced with respect to each other around the circumference of the load-bearing element.

12. The sensor of claim 11, wherein: the computer-executable instructions are configured so that the computer-executable instructions, when executed by the processor, cause the processor to calculate values of forces acting on the load-bearing member in the first direction and in two orthogonal directions each substantially perpendicular to the first direction, and values of torques acting on the load-bearing member about respective axes extending substantially in the first direction and in the two orthogonal directions, the calculations being based on outputs of the first thru twelfth strain gauges, and a matrix of predetermined calibration data relating the forces and the torques to response characteristics of the first through twelfth strain gauges.

13. The sensor of claim 12, wherein the matrix of predetermined calibration data is a six by twelve matrix having six rows and twelve columns of the predetermined calibration data.

14. A sensor for measuring forces and torques, comprising:
a load-bearing member having a longitudinal axis extending in a first direction;
a first plurality of strain gauges mounted on a surface of the load-bearing member so that each of the first plurality of strain gauges has a first common orientation in relation to the first direction;
a second plurality of strain gauges mounted on the surface of the load-bearing member so that each of the second plurality of strain gauges has a second common orientation in relation to the first direction, wherein the first and second pluralities of strain gauges are disposed in an alternating fashion around a circumference of the load-bearing member; and
a processor computing values for said forces and torques acting on the load-bearing member based on (1) outputs of the plurality of strain gauges, (2) a calibration matrix of predetermined calibration data relating the forces and torques to response characteristics of the first and second plurality of strain gauges, and (3) a calibration constant selected to compensate for systematic offset or bias in the forces and torques.

15. The sensor of claim 14, wherein each of the first plurality of strain gauges has a sensing axis that is angularly offset by a first angle from an associated reference line extending along the surface of the load-bearing member substantially in the first direction, and each of the second plurality of strain gauges has a sensing axis that is angularly offset by a second angle from an associated one of the reference lines, wherein the second angle is substantially equal in magnitude to and substantially opposite in direction from the first angle.

16. The sensor of claim 15, further comprising a memory communicatively coupled to the processor, and computer-executable instructions stored on the memory.

17. The sensor of claim 16, wherein the computer-executable instructions are configured so that the computer-executable instructions, when executed by the processor, cause the processor to calculate values of forces acting on the load-bearing member in two orthogonal directions each substantially perpendicular to the first direction, and values of torques acting on the load-bearing member about respective axes extending substantially in the first direction and in the two orthogonal directions.

18. The sensor of claim 17, further comprising
a third plurality of strain gauges mounted on the surface of the load-bearing member and communicatively coupled to the processor, where
the third plurality of strains gauges are mounted in pairs, each of the pairs being disposed in a substantially T-shaped pattern,
a sensing axis of a first of the strain gauges in each of the pairs extends substantially in the first direction, and
a sensing axis of a second of the strain gauges in each of the pairs is substantially perpendicular to the sensing axis of the first of the strain gauges in the pair.

19. The sensor of claim 16, further comprising a third plurality of strain gauges mounted on the surface of the load-bearing member so that a sensing axis of each of the third plurality of strain gauges is substantially perpendicular to the first direction.

20. A sensor for measuring forces and torques, comprising:
a load-bearing member having a longitudinal axis extending in a first direction;
a first plurality of strain gauges mounted on a surface of the load-bearing member so that each of the first plurality of strain gauges has a first common orientation in relation to the first direction;
a second plurality of strain gauges mounted on the surface of the load-bearing member so that each of the second plurality of strain gauges has a second common orientation in relation to the first direction, wherein the first and second pluralities of strain gauges are disposed in an alternating fashion around a circumference of the load-bearing member;
a processor communicatively coupled to the first and second pluralities of stain gauges;
a memory communicatively coupled to the processor;
computer-executable instructions stored on the memory; and
a third plurality of strain gauges mounted on the surface of the load-bearing member and communicatively coupled to the processor, where
the third plurality of strains gauges are mounted in pairs, each of the pairs being disposed in a substantially T-shaped pattern,
a sensing axis of a first of the strain gauges in each of the pairs extends substantially in the first direction, and
a sensing axis of a second of the strain gauges in each of the pairs is substantially perpendicular to the sensing axis of the first of the strain gauges in the pair;
wherein the computer-executable instructions are configured so that the computer-executable instructions, when executed by the processor, cause the processor to calculate values of forces acting on the load-bearing member in two orthogonal directions each substantially perpendicular to the first direction, and values of torques acting on the load-bearing member about respective axes extending substantially in the first direction and in the two orthogonal directions, the calculations being based on outputs of the first and second pluralities of strain gauges, and a matrix of predetermined calibration data relating the forces and the torques to response characteristics of the first and second pluralities of strain gauges;
wherein each of the first plurality of strain gauges has a sensing axis that is angularly offset by a first angle from an associated reference line extending along the surface of the load-bearing member substantially in the first direction, and each of the second plurality of strain gauges has a sensing axis that is angularly offset by a second angle from an associated one of the reference lines, wherein the second angle is substantially equal in magnitude to and substantially opposite in direction from the first angle; and wherein the computer-executable instructions are further configured so that the computer-executable instructions, when executed by the processor, cause the processor to calculate values for a force acting on the load-bearing member in the first direction based on outputs of the third plurality of strain gauges, the calculated values of the forces acting on the load-bearing member in the two orthogonal directions, the calculated values of the torques acting on the load-bearing member about the respective axes extending substantially in the first direction and in the two orthogonal directions, and a second matrix of predetermined calibration data.

21. A sensor for measuring forces and torques, comprising:
a load-bearing member having a longitudinal axis extending in a first direction;
a first plurality of strain gauges mounted on a surface of the load-bearing member so that each of the first plurality of strain gauges has a first common orientation in relation to the first direction;
a second plurality of strain gauges mounted on the surface of the load-bearing member so that each of the second plurality of strain gauges has a second common orientation in relation to the first direction, wherein the first and second pluralities of strain gauges are disposed in an alternating fashion around a circumference of the load-bearing member;
a processor communicatively coupled to the first and second pluralities of stain gauges, a memory communicatively coupled to the processor, and computer-executable instructions stored on the memory; and
a third plurality of strain gauges mounted on the surface of the load-bearing member so that a sensing axis of each of the third plurality of strain gauges is substantially perpendicular to the first direction, where each of the third plurality of strain gauges is communicatively coupled to the processor;
wherein each of the first plurality of strain gauges has a sensing axis that is angularly offset by a first angle from an associated reference line extending along the surface of the load-bearing member substantially in the first direction, and each of the second plurality of strain gauges has a sensing axis that is angularly offset by a second angle from an associated one of the reference lines, wherein the second angle is substantially equal in magnitude to and substantially opposite in direction from the first angle;
wherein: a first grouping of the third plurality of strain gauges is located at a first axial position on the load-bearing member above an axial position of the first plurality of strain gauges on the load-bearing member; a second grouping of the third plurality of strain gauges is located at a second axial position on the load-bearing member below the axial position of the first plurality of strain gauges on the load-bearing member; and the number of the strain gauges in each of the first and second groupings is equal.

22. The sensor of claim 21, wherein each of the strain gauges in the first grouping are equally spaced with respect to each other around a circumference of the load-bearing element; and each of the strain gauges in second grouping are equally spaced with respect to each other around the circumference of the load-bearing element.

23. The sensor of claim 22, wherein: the computer-executable instructions are configured so that the computer-executable instructions, when executed by the processor, cause the processor to calculate values of forces acting on the load-bearing member in the first direction and in two orthogonal directions each substantially perpendicular to the first direction, and values of torques acting on the load-bearing member about respective axes extending substantially in the first direction and in the two orthogonal directions, the calculations being based on outputs of the first, second, and third pluralities of strain gauges, and a matrix of predetermined calibration data relating the forces and the torques to response characteristics of the first, second, and third pluralities of strain gauges.

24. A sensor, comprising:
a load-bearing member having a longitudinal axis extending in a first direction;
a plurality of strain gauges mounted on a surface of the load-bearing member;
a processor communicatively coupled to the strain gauges;
a memory communicatively coupled to the processor; and
computer-executable instructions stored on the memory, wherein the computer-executable instructions are configured so that the computer-executable instructions, when executed by the processor, cause the processor to calculate a plurality of forces and torques acting on the load-bearing member at a load condition, the calculations being based on (1) responses of the strain gauges to the load condition, (2) at least one rectangular matrix of predetermined calibration data relating the forces and torques to response characteristics of the strain gauges, and (3) a calibration constant selected to compensate for systematic offset or bias in the forces and torques.

25. The sensor of claim 24, wherein first, second, third, fourth, fifth, and sixth strain gauges of the plurality of strain gauges are configured so that each of the first thru sixth strain gauges undergoes substantially the same strain in response to thermally-induced deflection of the load-bearing member.

26. A sensor, comprising:
a load-bearing member having a longitudinal axis extending in a first direction;
a plurality of strain gauges mounted on a surface of the load-bearing member;
a processor communicatively coupled to the strain gauges;
a memory communicatively coupled to the processor;
computer-executable instructions stored on the memory, wherein the computer-executable instructions are configured so that the computer-executable instructions, when executed by the processor, cause the processor to calculate a plurality of forces and torques acting on the load-bearing member at a load condition, the calculations being based on responses of the strain gauges to the load condition and at least one rectangular matrix of predetermined calibration data relating the forces and torques to response characteristics of the strain gauges;
a first, a second, a third, a fourth, a fifth, and a sixth of the plurality of strain gauges are configured so that each of the first thru sixth strain gauges undergoes substantially the same strain in response to thermally-induced deflection of the load-bearing member;
a processor communicatively coupled to the first, second, third, fourth, fifth, and sixth strain gauges;
a memory communicatively coupled to the processor; and computer-executable instructions stored on the memory;
wherein:
each of the first thru sixth strain gauges is symmetrically disposed about a respective line of symmetry in relation to another one of the first thru sixth strain gauges;
a seventh and an eighth of the plurality of strain gauges are communicatively coupled to the processor and are mounted in a substantially T-shaped pattern at a first circumferential position on the surface of the load-bearing member;

a sensing axis of the seventh strain gauge extends substantially in the first direction;

a sensing axis of the eighth strain gauge is substantially perpendicular to the sensing axis of the eighth strain gauge;

a ninth and a tenth of the plurality of strain gauges are communicatively coupled to the processor and are mounted in a substantially T-shaped pattern at a second circumferential position on the surface of the load-bearing member;

the second circumferential position is substantially diametrically opposite the first circumferential position;

a sensing axis of the ninth strain gauge extends substantially in the first direction; a sensing axis of the tenth strain gauge is substantially perpendicular to the sensing axis of the ninth strain gauge;

the computer-executable instructions are configured so that the computer-executable instructions, when executed by the processor, cause the processor to calculate values of forces acting on the load-bearing member in two orthogonal directions each substantially perpendicular to the first direction, and values of torques acting on the load-bearing member about respective axes extending substantially in the first direction and in the two orthogonal directions, the calculations being based on outputs of the first thru sixth strain gauges, and a five by six matrix of predetermined calibration data relating the forces and the torques to response characteristics of the first, second, third, fourth, fifth, and sixth strain gauges; and the computer-executable instructions are further configured so that the computer-executable instructions, when executed by the processor, cause the processor to calculate values for a force acting on the load-bearing member in the first direction based on outputs of the seventh thru tenth strain gauges, the calculated values of the forces acting on the load-bearing member in the two orthogonal directions, the calculated values of the torques acting on the load-bearing member about the respective axes extending substantially in the first direction and in the two orthogonal directions, and a one by six matrix of predetermined calibration data.

27. A sensor, comprising:

a load-bearing member having a longitudinal axis extending in a first direction;

a plurality of strain gauges mounted on a surface of the load-bearing member;

a processor communicatively coupled to the strain gauges;

a memory communicatively coupled to the processor;

computer-executable instructions stored on the memory, wherein the computer-executable instructions are configured so that the computer-executable instructions, when executed by the processor, cause the processor to calculate a plurality of forces and torques acting on the load-bearing member at a load condition, the calculations being based on responses of the strain gauges to the load condition and at least one rectangular matrix of predetermined calibration data relating the forces and torques to response characteristics of the strain gauges;

a processor communicatively coupled to the first, second, third, fourth, fifth, and sixth of the plurality of strain gauges;

a memory communicatively coupled to the processor; and computer-executable instructions stored on the memory;

wherein:

a seventh, an eighth, a ninth, a tenth, an eleventh, and a twelfth of the strain gauges are communicatively coupled to the processor and are mounted on the surface of the load-bearing member so that a sensing axis of each of the seventh thru twelfth strain gauges is substantially perpendicular to the first direction;

the seventh, eighth, and ninth strain gauges are located at a first axial position on the load-bearing member above an axial position of the first thru sixth strain gauges on the load-bearing member;

the tenth, eleventh, and twelfth strain gauges are located at a second axial position on the load-bearing member below the axial position of the first thru sixth strain gauges on the load-bearing member;

the seventh, eighth, and ninth strain gauges are equally spaced with respect to each other around a circumference of the load-bearing element;

the tenth, eleventh, and twelfth strain gauges are equally spaced with respect to each other around the circumference of the load-bearing element;

the computer-executable instructions are configured so that the computer-executable instructions, when executed by the processor, cause the processor to calculate values of forces acting on the load-bearing member in the first direction and in two orthogonal directions each substantially perpendicular to the first direction, and values of torques acting on the load-bearing member about respective axes extending substantially in the first direction and in the two orthogonal directions, the calculations being based on outputs of the first thru twelfth strain gauges, and a six by twelve matrix of predetermined calibration data relating the forces and the torques to response characteristics of the first through twelfth strain gauges.

* * * * *